United States Patent [19]
Van Overbeek et al.

[11] 3,745,406
[45] July 10, 1973

[54] METHOD AND DEVICE FOR STANDARDIZING SIZE AND POSITION OF PICTURES

[75] Inventors: Adrianus Johannes Wilhelmus Marie Van Overbeek; Leendert Gerardus Krul, both of Emmasingel, Eindhoven, Netherlands

[73] Assignee: U.S. Philips Corporation, New York, N.Y.

[22] Filed: Jan. 4, 1971

[21] Appl. No.: 103,471

[30] Foreign Application Priority Data

Jan. 8, 1970 Netherlands....................7000190

[52] U.S. Cl................................. 315/25, 340/324 A
[51] Int. Cl............................................... H01j 29/70
[58] Field of Search.................. 315/18, 22, 25, 24; 340/324 A

[56] References Cited

UNITED STATES PATENTS

| | | | |
|---|---|---|---|
| 3,109,166 | 10/1963 | Kronenberg et al. | 315/22 X |
| 3,395,310 | 7/1968 | Van Zuuren | 315/22 |
| 3,396,306 | 8/1968 | Mallebrien | 315/22 |
| 3,413,453 | 11/1968 | Thorpe | 315/18 X |
| 3,462,639 | 8/1968 | French | 315/22 X |
| 3,555,538 | 1/1971 | Henderson et al. | 315/18 X |
| 3,609,444 | 9/1971 | Van Den Heuvel | 315/18 |

*Primary Examiner*—
*Attorney*—Frank R. Trifari

[57] ABSTRACT

Method and device for standardizing the size and position of pictures on an image screen, the extreme boundaries of a picture being determined and employed in the form of voltages for feeding a set of potentiometers, at the tappings of which voltages are produced, which represent a division of the picture between said boundaries. These voltages are compared with a sawtooth voltage synchronous with the image frequency or with the image line frequency; in the event of equality with said sawtooth voltage time pulses are obtained, which are capable of controlling gates which pass for further processing data of the picture regardless of its size and position. The device for carrying out said method may be an analogue, a digital or an analogue-digital device FIGS. 2, 6.

8 Claims, 7 Drawing Figures

INVENTOR.
ADRIANUS J.W.M. VAN OVERBEEK
LEENDERT G. KRUL
BY

AGENT

INVENTOR
ADRIANUS J.W.M. VAN OVERBEEK
LEENDERT G. KRUL
BY

AGENT

METHOD AND DEVICE FOR STANDARDIZING SIZE AND POSITION OF PICTURES

The invention relates to a method and devices for carrying out said method of standardizing pictures on a picture screen, in which a picture is scanned in at least one direction. The term "direction" is to denote here the direction of an image line, for example, the horizontal direction. The displacement of the image line across the image screen transverse of the direction of the image line (vertical) then covers the complete image scan. The technology of identifying characters and other pictures involves in general the problem of identifying readily and unambiguously pictures varying more or less in size and/or projected on varying places of the picture screen. It is desirable to standardize the size and the position of the picture before it is subjected to the identifying process so that in all cases the same points or parts of a picture are used for abstracting identifying information regardless of the size or the position thereof on the picture screen. The method according to the invention provides a simple means for achieving such a standardization and is characterized in that a sawtooth voltage synchronous with the image frequency is sampled at the instants when the scanning means reaches the extreme limits of a picture on the screen transverse of the scanning direction, the sample voltages thus obtained serving for feeding a set of potentiometers, at the tappings of which partial voltages appear, the values of which are lying between the two said sample voltages, and in that at a second scan of the picture in said one direction by comparison between said sawtooth voltage and the said partial voltages time pulses may be produced at the instants of equality between the sawtooth voltage and one of the partial voltages, said pulses controlling gates which pass for further processing data of the picture regardless of the size and position of the picture transverse of said at least one direction. Likewise standardization may be performed in said one direction without changing the direction of scanning. For this purpose a variant of the method according to the invention is characterized in that a sawtooth voltage synchronous with the image line frequency is sampled at the instant(s) at which the scanning means passes across the picture, the highest and the lowest of these sampling voltages at the termination of a complete picture scan representing the extreme boundaries of the picture in the scanning direction and serving to feed a set of potentiometers, at the tappings of which partial voltages appear, the values of which are lying between said highest and lowest voltages and in that at the second scan by comparison between the sawtooth voltage synchronous with the image line frequency and the last-mentioned partial voltages time pulses are produced which are capable of controlling gates which pass data of the picture for further processing independently of the size and the position in said one scanning direction.

By simultaneously scanning in more than one direction standardization may, of course, be performed at the same time in several directions. By changing the scanning direction, for example, transversely of said first direction standardization may be performed in several directions by means of one scanning beam and of one and the same device. By simultaneously carrying out said two methods according to the invention standardization may be obtained in a direction transverse of the scanning direction and in the scanning direction itself during the scan in one direction.

When the resultant time pulses cannot be immediately processed, they may be stored for serving at a later instant for controlling the abstraction of the picture information for identification. For this purpose the method according to the invention is furthermore characterized in that the time pulses each determine the position of a counter, said counter positions being stored in a store, from which they serve as a further control-information in picture scanning. The method according to the invention may be carried out by devices operating on the basis of analogue technology. In this case the device according to the invention for carrying out said first method is characterized in that it comprises a detection device for determining from the video signal the instants at which the scan passes across a picture for the first time and the last time, there being provided a sampling device in which the sawtooth voltage synchronous with the frame frequency is sampled at the resultant instants, the sampling voltages thus obtained being stored in a storage element, which forms a voltage source for the set of potentiometers. The device comprises furthermore comparison devices to which are applied individually a partial voltage from a tapping of the potentiometer and said sawtooth voltage so that in the event of equality in one of the comparison devices a time pulse is produced. It is, however, also possible to carry out the first-mentioned method by means of digital device. Such a device according to the invention for carrying out the first-mentioned method is characterized in that it comprises a clock pulse counter which is filled by a clock pulse signal during a complete scan, there being provided a first register and a second register for storing the positions of the clock pulse counter at the instants at which a picture is struck for the first time and the last time respectively by the scanning beam, the two register positions representing, at the termination of a complete scan, the extreme boundaries of the picture transverse of the scanning direction, whilst the difference between the register positions obtained by subtraction in a summation circuit is divided with the aid of a dividing circuit by a number of factors so that binary digit values are obtained which, after summation with the lower register position of said registers in relationship to said clock pulses, represent a time division of the picture between the extreme boundaries and which are stored in a store.

Finally the analogue and digital methods may be combined. A device according to the invention may also comprise the aforesaid digital part for obtaining the extreme boundaries, the digital values of said boundaries being converted into corresponding analogue voltage values, which are applied as supply voltages to the set of potentiometers of the analogue device.

Also for carrying out the said second method analogue and digital devices are conceivable. An analogue device for carrying out the second method comprises a video-signal sampling device in which the video signal is sampled by a sawtooth voltage synchronous with the line frequency, there being provided a detection device which detects the highest and the lowest of the resultant sampling voltages.These voltages represent the extreme boundaries of the picture in the direction of the image lines and are stored in a storage element, which constitutes the voltage source for a set of potentiometers. The device comprises furthermore comparison devices to each of which are applied a partial voltage from a tapping of a potentiometer and said sawtooth voltage synchronous with the line frequency so that in the event of equality in one of the comparison device a time pulse is produced.

A digital device for carrying out the second method comprises a clock pulse counter, which is filled by a clock pulse signal during the scan of an image line, and a first and a second register, in which the positions of the clock pulse counter at the instants when a scanning line passes across a picture for the first time and for the last time are stored, the arrangement being, however, such that the position of the clock pulse counter is lower than the prior position of the first register and higher than the prior position of the second register, the two register positions, at the termination of a complete picture scan, representing the extreme boundaries of the picture in the direction of the image line, whilst the difference between the register positions obtained by subtraction in a summation circuit is divided by means of a dividing circuit by a number of factors so that binary digit values are obtained, which, after summation with the lower position of the aforesaid registers in relationship to said clock pulses of such a frequency that said counter is filled within the time corresponding to the image line frequency, represent a time division of the picture between the extreme boundaries in the direction of the image line and which are stored in a storage element. Combinations of analogue and digital devices for carrying out this method are also conceivable. A combination of the first and second methods is carried out by a device formed by the combination of the aforesaid devices.

It should be noted that the time pulses obtained in accordance with the invention may advantageously be utilized in a character-identifying method as disclosed in Dutch Pat. No. 104,327. The time pulses then control the gate circuits connected to the inputs of the channels which correspond to scanning zones in which characteristic properties of a character, for example, the first derivative thereof, are observed.

The invention will now be described more fully with reference to the Figure.

In the drawing FIGS. 1*a* and 1*b* illustrate characters divided in accordance with the standardization.

Figure 1A:
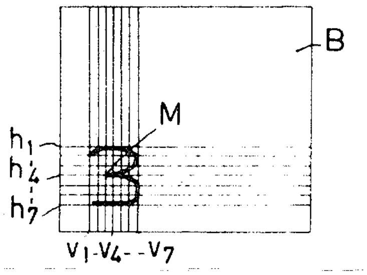
Figure 1B:
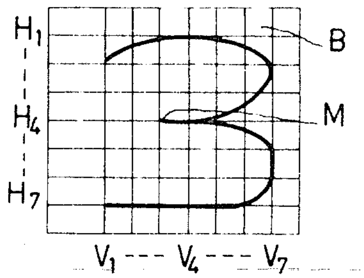

FIGS. 1*a* and 1*b* illustrate a character 3 on a picture screen B. The size and position of this character on the screens are considerably different. In order to obtain a satisfactory identification of one character and of the other the characters are first standardized. In accordance with the method embodying the invention this means that the extreme boundaries of the characters are determined. These may be formed by the lines $h_1$ and $h_7$, $H_1$ and $H_7$ respectively or the lines $v_1$ and $v_7$, $V_1$ and $V_7$ respectively. In accordance with the invention a division is made between these boundaries, in this example, by five scanning lines $h_2$ . . $h_6$ and $H_2$ . . $H_6$ and five lines transverse of said scanning lines $v_2$ . . $v_6$ and $V_2$ . . $V_6$ respectively, which are in this case chosen to be at equal distances from each other. It should be noted that a different division with relatively different spacings is, of course, also possible if it is advantageous for the identifying process. The instants $th_1$ . . $th_7$, $tv_1$ . . $tv_7$ and $tH_1$ . . $tH_7$, $tV_1$ . . $tV_7$ respectively, at which the scanning lines occur, are determinative of the standardization: each character 3 scanned at such an instant $t_i\,(i=h, H, v, V)_j$ provides the same characteristic information independently of the size and the position. In this example the character of FIG. 1*a* provides at the instant $th_4$ at which the line $h_4$ occurs the information of the character centre in a vertical sense M. The same character centre M is provided by the character of FIG. 1*b* at the corresponding instant $tH_4$, and so forth. When said division is used for a division into zones, the same part of a character in a given zone is invariably observed independently of size and position. For example, the zone of FIG. 1*a* with the boundary lines $v_3$ and $v_4$ comprises the junction of the upper and lower sides of the character 3 at the central part. The same applies to the zone of FIG. 1*b* with the corresponding boundary lines $V_3$ and $V_4$.

Figure 2:
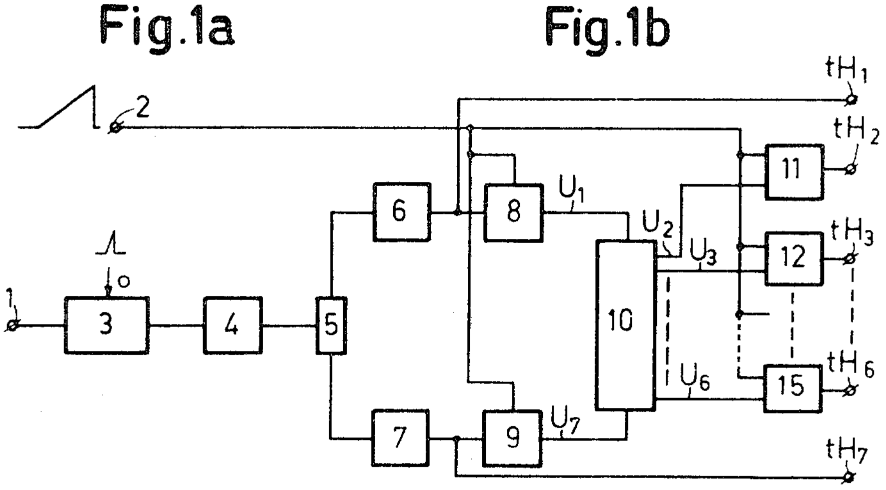
FIG. 2 shows an analogue device for carrying out the first method embodying the invention.

FIG. 2 shows an analogue device for carrying out the firstmentioned method embodying the invention. Reference numeral 1 designates the input to which is applied a video signal obtained by scanning a picture on a screen. In this example, it is assumed that the scan is horizontal. To the terminal 2 is applied a sawtooth voltage which is synchronous with the frame frequency of the picture on the screen. In this embodiment the detection device for determining in the video signal the instants at which the scan passes across a picture for the first time and for the last time is an additional sampling device 3 the video signal is sampled by a sawtooth voltage supplied at the input O and which is in synchronism with the image line frequency. In a block former 4 a square-wave pulse is derived from the sampled signal, which pulse is suitable for further processing. Reference numeral 5 designates a differentiator in which the square-wave pulse is differentiated and to which the positive pulse of a monostable trigger 6 and the negative pulse of a monostable trigger 7 are applied. These triggers provide each a sharply defined pulse which serves for sampling the sawtooth voltage. For this purpose the sawtooth voltage is applied to sampling devices 8 and 9, to which are also connected the outputs of the triggers 6 and 7 respectively.

The sampling devices 8 and 9 are formed herein each by a pulse-controlled gate, which passes a voltage at a further terminal (in this case the sawtooth voltage) only for the duration of the pulse. The resultant sampling voltages $U_1$ to $U_7$ are applied to the device 10, which comprises storage elements for storing the sampling voltages and a set of potentiometers. The voltages $U_2$ . . $U_6$ appearing at tappings of the potentiometers are applied to comparison devices 11, 12 . . 15, to which said sawtooth voltage is also applied. At the instants of equality of voltage the time pulses $tH_2$ . . $tH_6$ are produced at the outputs of the comparison devices 12, . . 15. The time pulses of the first and last boundaries of the character, scanned horizontally, are already available after the triggers 6 and 7 respectively.

The operation of the device shown in FIG. 2 will be described more fully with reference to FIGS. 3 and 4.

Figure 3:
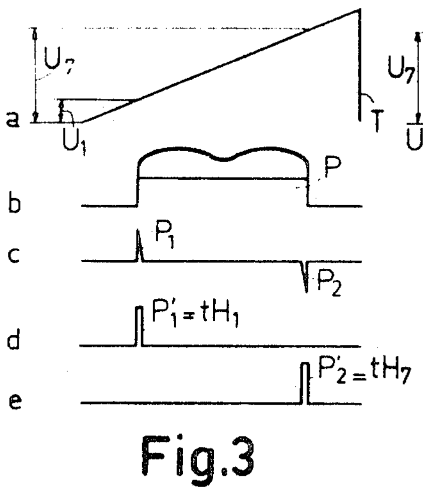
FIGS. 3 and 4 illustrate the operation of the device of FIG. 2.
Figure 4:
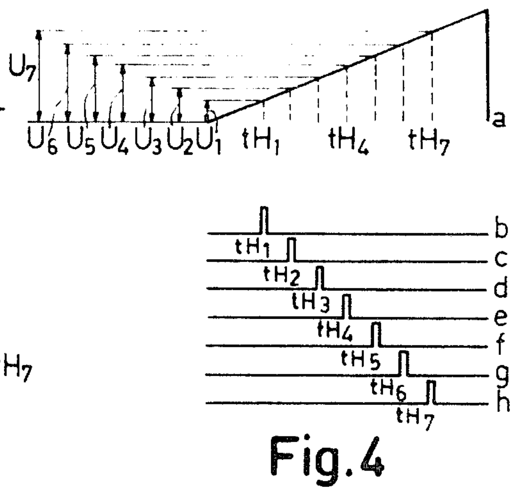

FIG. 3 illustrates the sawtooth voltage which is synchronous with the frame frequency. FIG. 3*b* illustrates the video signal sampled in the additional sampling device 3 as well as the square-wave pulse P produced in the pulse shaper 4. FIG. 3*c* illustrates the square-wave pulse differentiated in the device 5 ($T_1$, $T_2$). FIG. 3*d* illustrates the pulse $V'_1$ formed in the trigger 6 from the positive pulse produced in the device 5 P1. FIG. 3*e* illustrates the pulse $P'_2$ produced in the trigger 6 from the negative pulse $P_2$ formed in the device 5. The pulses $P'_1$ and $P'_2$ represent the time pulses $tH_1$ and $tH_7$ indicating the instants of appearance of the extreme boundaries of the picture transverse of the scanning direction in a complete horizontal scan.

Sampling of the sawtooth voltage by pulse $P'_1$ in the sampling device 8 produces a voltage $U_1$, which is a measure for one extreme boundary of the character and sampling of the sawtooth voltage by the pulse $P'_2$ in the sampling device 9 provides a voltage $U_7$, which is a measure for the other extreme boundary of the character.

Figure 5:
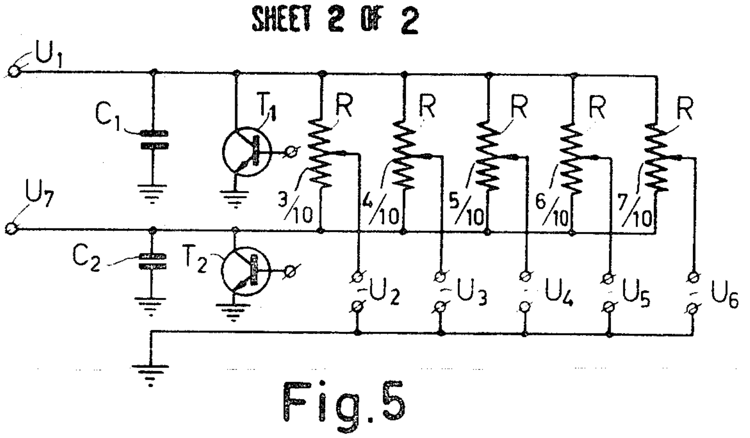
FIG. 5 shows a set of potentiometers and a storage element.

The voltages $U_1$ and $U_7$ are stored in the device 10 and used as supply voltages for a number of potentiometers. The tappings of the potentiometers are disposed so that the desired subdivision between the two voltages $U_1$ and $U_7$ is obtained. These are, for example the voltage values $U_2$ . . $U_6$ as indicated in FIG. 4*a*. Each of these voltages is applied to a comparison device 11, etc. and compared with the frame-frequency sawtooth voltage re-appearing at the second scan of the character in said horizontal direction. At the instants of equality of $U_2$ . . $U_6$ to the sawtooth voltage the time pulses $tH_2$, $tH_3$, . . . $tH_6$ are delivered. These pulses are again illustrated in FIGS. 4*b* to 4*h*. In an identical manner time pulses can be obtained with a vertical line scan or a line scan at a different angle. FIG. 5 shows more in detail the principle of the device 10. $C_1$ and $C_2$ designate a storage element formed by capacitors, to which are also applied the sampling voltages $U_1$ and $U_7$ respectively. The capacitors $C_1$ and $C_2$ can be discharged via base-controlled transistors $T_1$ and $T_2$ respectively when new sampling voltages are produced by the next character. The load of the capacitor as a supply source is high-ohmic and is formed by a plurality of potentiometers R, which may have the same resistance values. In this example the positions of the tappings of the potentiometers R are chosen so that five voltages $U_2$, $U_3$, $U_4$, $U_5$ and $U_6$ are formed between the voltages $U_1$ and $U_7$, the differences between said voltages being equal to each other. This corresponds to the example of FIGS. 4 and 3. The tappings are then located at 3/10th, 4/10th, 5/10th, 6/10th and 7/10th of the distance from the lower sides of the potentiometers R.

An analogue device for carrying out the second method of standardizing in the line scanning direction, that is to say for finding the lines $v_1$ . . $v_7$ of FIG. 1*a* and $V_1$ . . $V_7$ in FIG. 1*b* respectively is substantially equal to the device described above, the difference being, however, that a detection device is provided, in which the highest and the lowest of the sampling voltages obtained by sampling with the sawtooth voltage synchronous with the line frequency are detected. Said voltages then represent the extreme boundaries in the line direction.

Figure 6:
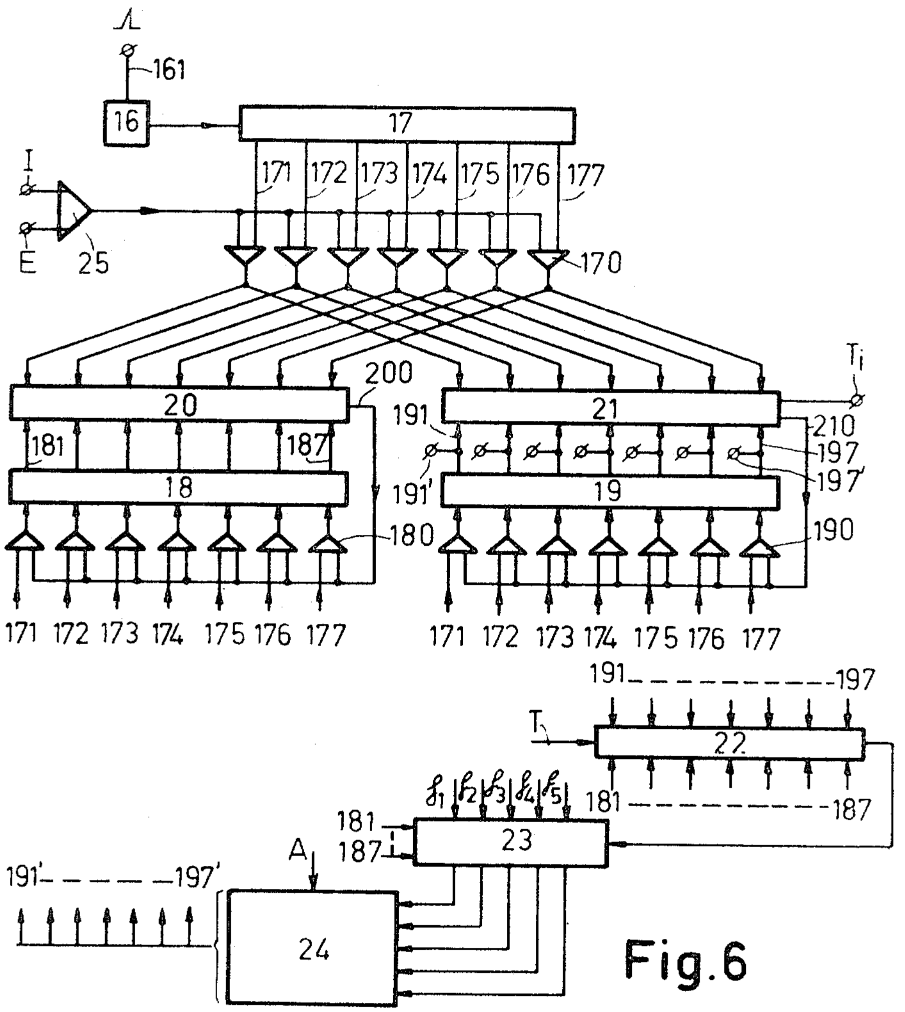
FIG. 6 shows a digital device for carrying out the second method embodying the invention.

FIG. 6 shows a potential construction of a digital device for carrying out the second method of standardizing in the line scanning direction in accordance with the invention. Reference numeral 16 designates a clock pulse generator supplying a fixed number of clock pulses for filling a clock pulse counter 17 within a time corresponding to the duration of a line scan indicated by the sawtooth at the input 161. The clock pulse generator 16 is controlled via the input 161 in order to obtain first the extreme boundaries of a picture in the line direction on the screen. The video signal is applied to input I. Each time when the scanning beam passes over a picture, the input I receives a pulse which is applied to and-gates 170. The position attained in the counter 17 at such a pulse instant is transmitted via the conductors 171 . . 177 by the gates 170 to comparison devices 20 and 21. Counter positions stored in the registers 18 and 19 are also transmitted to the comparison devices 20 and 21 via the conductors 181 . . 187 and 191 . . 197 respectively. If at said pulse instant the position of counter 17 is lower than the prior position stored in register 18 a pulse appears at the output 200 of the device 20, which pulse opens the and-gates 180 for adapting the position of register 18 via the conductors 171 . . 177 to the position of the counter 17. If at said pulse instant the position of counter 17 is higher than the prior position stored in register 19, a pulse appears at the output 210 of the comparison device 21, which pulse opens the and-gates 190 in order to adapt the position of register 19 via the conductors 171 . . 177 to the position of the counter 17. After a complete picture scan the position in register 18 represents one extreme boundary of the picture ($V_1$) and the position of register 19 represents the other extreme boundary ($V_7$) of the picture in the line direction.

After a complete picture scan (instant T in FIG. 3*a*) a summation device 22 determines the difference between the positions of the registers 18 and 19 and this difference is divided in a dividing circuit 23 by a plurality of factors $f_1$, $f_2$, . . $f_5$ so that binary digit values are obtained, which after summation with the higher position of said registers, i.e., register 18, represent a division of the picture between the extreme boundaries. These digit values may be stored in a store 24. From the store these digit values can be applied, at a second scan, to, for example, the comparison device 21 via an input A one after the other via the conductors 191 . . 197.

At a second scan of a picture the position of counter 17 is constantly applied to the comparison device 21 owing to a signal E at the or-gate 25, which holds the gates 170 constantly in the open state. In every event of equality a digital value transferred from the store via conductors 191' . . 197' to the comparison device 21 and the position of counter 17, this is recognized in device 21, which then delivers a pulse at the output T*i*. The pulses at the output T*i* are the desired pulses *ti*.

A digital device for carrying out the first method of standardizing in a direction transverse of the line scanning direction is largely identical to the device described above, the difference being that it comprises a clock pulse counter, which is filled by a clock pulse signal during one complete picture scan, the device comprising a first register and a second register in which the positions of the clock pulse counter at the instants when during picture scanning the scanning beam crosses a picture for the first time and for the last time respectively are stored so that at the termination of a complete picture scan the two register positions represent the extreme boundaries of the picture in a direction transverse of the scanning direction, whilst the difference between the register positions obtained by subtraction in a summation device is divided by means of a dividing device by a plurality of factors so that binary digit values are formed which, after summation with the lower one of the aforesaid register positions, in relationship to said clock pulses of such a frequency that said counter is filled within the time corresponding to the picture frequency, provide a time division of the picture between the extreme boundaries in a direction transverse of the scanning direction and which are stored in a store.

What is claimed is:

1. A method of standardizing size and position of images on a screen, comprising the steps of scanning the image with a raster-type scan, providing a saw-tooth voltage in synchronism with the frame frequency of the raster scan, detecting the instants when the scan impinges on the extreme boundaries of the image on the screen, sampling the saw-tooth voltage during each indication of a image boundry, storing the sample voltages, forming at least two partial voltages each having a different value between the values of the stored sampled voltages by connecting the stored sample voltages across at least two potentiometers each having different scaling ratios and by deriving the partial voltages from the potentiometer tappings, comparing the saw-tooth voltage produced during a later scan with the partial voltages, producing timing pulses at those instants when the saw-tooth voltage is equal to a partial voltage, and connecting the image signal to a plurality of gates each controlled by the timing pulses.

2. A method as claimed in claim 1 further comprising the steps of scanning the image in a direction transverse to the first scan, and repeating the steps recited in claim 1 following the step of scanning.

3. A device for standardizing the size and position of images on a screen scanned with a raster-type scan by producing a plurality of sampling pulses during the passage of the scan over the image independent of the location of the image and scaled to the size of the image, the raster-type scan having a pre-determined line frequency and frame frequency, comprising means for providing a saw-tooth voltage synchronized with the frame scanning rate, means for indicating the passage of the scan over the extremities of the image on the screen, means responsive to the indicating means for storing the magnitude of the saw-tooth voltage at those instants when the scan passes over the extremities of the image, means connected to the storing means for providing at least two different partial voltages having values intermediate the stored sample voltages, and means for comparing the saw-tooth voltage produced during a later scan with the partial voltages and for providing an output pulse in response to a determination by the comparison device that the saw-tooth voltage produced during the second scan is equal to each partial voltage.

4. Apparatus as claimed in claim 3, wherein the means for providing at least two partial voltages comprises a plurality of potentiometers connected to the storing means, the partial voltages being provided at the tapping of each potentiometer.

5. Apparatus as claimed in claim 3, wherein the means for storing the magnitude of the saw-tooth voltage comprises a source of clock pulses synchronized with the saw-tooth voltage, a counter connected to the clock pulse source and providing an output indicating the magnitude of the saw-tooth voltage, and a digital storage register connected to the counter and to the indicating means.

6. Apparatus as claimed in claim 3, wherein the means for comparing the saw-tooth voltage with the partial voltages comprises a separate comparison device connected to each partial voltage and to the saw-tooth voltage for providing the output pulses indicating that the saw-tooth voltage is equal to each partial voltage.

7. A device as claimed in claim 3, wherein the means for storing the magnitude of the saw-tooth voltage comprises a clock pulse generator synchronized with the saw-tooth voltage, a digital counter connected to the clock pulse source and having a counting capacity equal to the number of clock pulses in a complete picture scan, a first register connected to the counter for storing the digital output of the counter indicating the first passage of the scan over one extremity of the image, a second register connected to the counter for storing the digital indication of the magnitude of the saw-tooth voltage at the instant when the scan passes over the other extremity of the image, wherein the means for providing at least two partial voltages comprises means for subtracting the contents of the first and second registers, means for dividing the difference by at least two factors and means for adding the results of the division to the contents of the first register whereby digital numbers are formed corresponding to partial voltages.

8. A device as claimed in claim 3, wherein the means for storing the magnitude of the saw-tooth voltage comprises a clock pulse generator synchronized with the saw-tooth voltage, a counter connected to the clock pulse generator and having a counting capacity equal to the number of clock pulses in a complete picture scan, a first register connected to the counter and to the indicating means for storing the contents of the counter at the instant when passage over a first extremity of the picture is indicated, and a second register connected to the counter and to the indicating means for storing the counter contents at the instant when passage over a second extremity of the picture is indicated, and wherein the means for providing at least two partial voltages comprises a digital to analogue converter connected to each register for providing a voltage corresponding to the contents of the respective counter and at least two potentiometers connected to the output of both digital to analogue converters, the potentiometers having different dividing ratios whereby the partial voltages are produced at the tapping of the potentiometers.

* * * * *